(12) United States Patent
Ogawa

(10) Patent No.: US 7,945,937 B2
(45) Date of Patent: May 17, 2011

(54) PROGRAMMABLE DISPLAY DEVICE

(75) Inventor: Masaki Ogawa, Osaka (JP)

(73) Assignee: Digital Electronics Corporation, Osaka (JP)

( * ) Notice: Subject to any disclaimer, the term of this patent is extended or adjusted under 35 U.S.C. 154(b) by 819 days.

(21) Appl. No.: 11/263,775

(22) Filed: Nov. 1, 2005

(65) Prior Publication Data

US 2006/0097956 A1     May 11, 2006

(30) Foreign Application Priority Data

Nov. 5, 2004   (JP) ................................ 2004-322659

(51) Int. Cl.
*H04N 7/173*     (2011.01)
*G05B 11/01*     (2006.01)
*H04N 5/445*     (2011.01)

(52) U.S. Cl. ........ 725/105; 340/501; 341/154; 345/214; 700/18

(58) Field of Classification Search .................. 345/564, 345/204, 214; 341/154; 340/501; 725/45; 370/414, 444; 700/718
See application file for complete search history.

(56) References Cited

U.S. PATENT DOCUMENTS

| 5,247,358 | A | * | 9/1993 | Richards ....................... 348/191 |
| 5,889,669 | A | * | 3/1999 | Kagami et al. .................. 700/17 |
| 6,008,836 | A | * | 12/1999 | Bruck et al. ................... 725/131 |
| 6,128,009 | A | * | 10/2000 | Ohkura et al. .................. 725/46 |
| 6,862,553 | B2 | * | 3/2005 | Schwenke et al. ............. 702/183 |
| 7,603,183 | B1 | * | 10/2009 | Munemoto ..................... 700/17 |
| 2003/0018654 | A1 | | 1/2003 | Miwa et al. |
| 2006/0190624 | A1 | * | 8/2006 | Kegoya et al. ................ 709/246 |

FOREIGN PATENT DOCUMENTS

| EP | 1271273 | 1/2003 |
| JP | 60-217411 | 10/1985 |
| JP | 01-304598 | 12/1989 |
| JP | 08-022317 | 1/1996 |
| JP | 10-105147 | 4/1998 |
| JP | 2003-5825 A | 1/2003 |
| JP | 2003-295908 | 10/2003 |

OTHER PUBLICATIONS (John F. Wakerly; Digital Design, Principles & Practices; 1994; $2^{nd}$ Edition; pp. 15-17).*
European search report for corresponding application No. 05024089.4 mailed Aug. 6, 2009.

* cited by examiner

*Primary Examiner* — Christopher Kelley
*Assistant Examiner* — Reuben M Brown
(74) *Attorney, Agent, or Firm* — Renner, Otto, Boisselle & Sklar, LLP

(57) ABSTRACT

A programmable display device selects and displays one screen data item from one of screen data groups each constituted of a plurality of screen data items indicative of control conditions. Further, the programmable display device includes a selection information forming section and a screen data group setting section. The selection information forming section is included in a project setting processing section, and based on screen data group information concerning the screen data groups, forms selection information by which one of the screen data groups is selected. The screen data group setting section is included in the project setting processing section, and sets, as a screen data group to be used, the one of the screen data groups which is selected based on the selection information.

18 Claims, 7 Drawing Sheets

PROGRAMMABLE DISPLAY DEVICE

This non-provisional application claims priority under 35 U.S.C. §119(a) on Patent Application No. 2004/322659 filed in Japan on Nov. 5, 2004, the entire contents of which are hereby incorporated by reference.

FIELD OF THE INVENTION

The present invention relates to a programmable display device that is able to manage many screens easily.

BACKGROUND OF THE INVENTION

A programmable display device is an operational display device having an interface with a host controller (PLC), and having functions such as for displaying an operating condition of a device connected to the host controller and receiving from a screen an operational input for providing control instructions to the device. Generally, a programmable display device has a graphical display function, and accordingly can display a console, a switch, a display lamp and the like, so as to serve as an operating terminal in a controlling system.

A screen displayed on such a programmable display device can be created by a user, using screen creation software, according to a specification of a controlling system. In creating a screen, the user uses parts, a drawing function and the like provided by the screen creation software in a personal computer and the like, so as to create a desired screen.

The parts are images for illustrating a switch, a numeric keypad, a meter display device, a graph display device and the like, and are provided in a library form in the screen creation software so as to be combined and used in the same manner as real parts. Further, the parts are used in a manner where images for showing the parts, and assigning data for displaying dynamic changes of the images on a specified position of the screen, are combined with one another. The assigning data is stored as a portion of screen data in a memory of the programmable display device.

The created screen is transferred as the screen data to the programmable display device and stored therein. When the host controller is in operation, an output part such as the meter display device, displayed on the screen displayed on a display section of the programmable display device, changes dynamically according to a condition of a device connected to the host controller. Further, input operations performed on the screen at an input part displayed on the screen, such as a switch, is provided to the device as control instructions.

Further, the created screen is managed in such a manner that it is able to be called back by a screen number, and is managed as a series of related plural screens with respect to a target system that is an object of controlling. For example, Japanese Laid-Open Patent Publication No. 105147/1998 (Tokukaihei 10-105147) (published date; Apr. 24, 1998) discloses a technique in which a project file is constituted of one or more unit screen files and each screen is managed.

It has been general so far that a single programmable display device stores a single project file. In such a case, for example, as for a programmable display device that can be connected with two PLCs, screens corresponding to each PLC are created in one project file, and a screen corresponding to a selected PLC is called back. In a screen displaying a switch for switching PLCs, the switch is operated, and thereby PLCs are switched (a PLC is selected).

However, in recent limited production of a wide variety of products, in order to deal with a wide variety of products by a single production line, it is necessary for a single project file to include screens corresponding to production lines of all kinds of products. As a result, multiple screens are included in a single project file, resulting in such an inconvenience that a management of screens in the project file becomes complex, and a memory capacity for storing the project file in the programmable display device is used up.

In order to avoid a shortage of the memory capacity, there is known the following method. In this method, with respect to each switching of production lines, the project file in use which is stored in the memory of the programmable display device is backed up in a storage medium, and on the other hand a project file corresponding to a production line to be switched, which project file is separately backed up in the storage medium, is transferred to the programmable display device. However, in such a method, it takes much time to transfer the project file, and therefore it is impossible to promptly change production lines according to frequent changes of products.

SUMMARY OF THE INVENTION

The present invention is made in view of the foregoing problems, and its object is making it easy to manage a plurality of project files.

In order to solve the foregoing problems, the programmable display device of the present invention selects and displays one screen data item from one of screen data groups each constituted of a plurality of screen data items indicative of control conditions, the programmable display device including: a selection information forming section for forming selection information used for selecting one of the screen data groups, based on screen data group information concerning the screen data groups; and a screen data group setting section for setting, as a screen data group to be used, the one of the screen data groups which is selected based on the selection information.

With the arrangement, the selection information forming section forms selection information, based on screen data group information concerning the screen data groups. The screen data group information includes, for example, names of the screen data groups, and these names are formed as the selection information in a list style. When a screen data group is selected from the selection information, the screen data group setting section sets the screen data group as a screen data group to be used.

As a result, the screen data groups are switched and set, and thereby the screen data groups can be dispersed and managed in internal and external storage sections. Therefore, it is unnecessary to cause one screen data group to include screens corresponding to all kinds of products to respond to a variety of products by a single production line for the purpose of limited production of a wide variety of products. As such, it is sufficient to provide screen data groups corresponding to each product.

For a fuller understanding of the nature and advantages of the invention, reference should be made to the ensuing detailed description taken in conjunction with the accompanying drawings.

DESCRIPTION OF THE EMBODIMENTS

An embodiment of the present invention is described below with reference to FIGS. 1 through 9.

Figure 1:
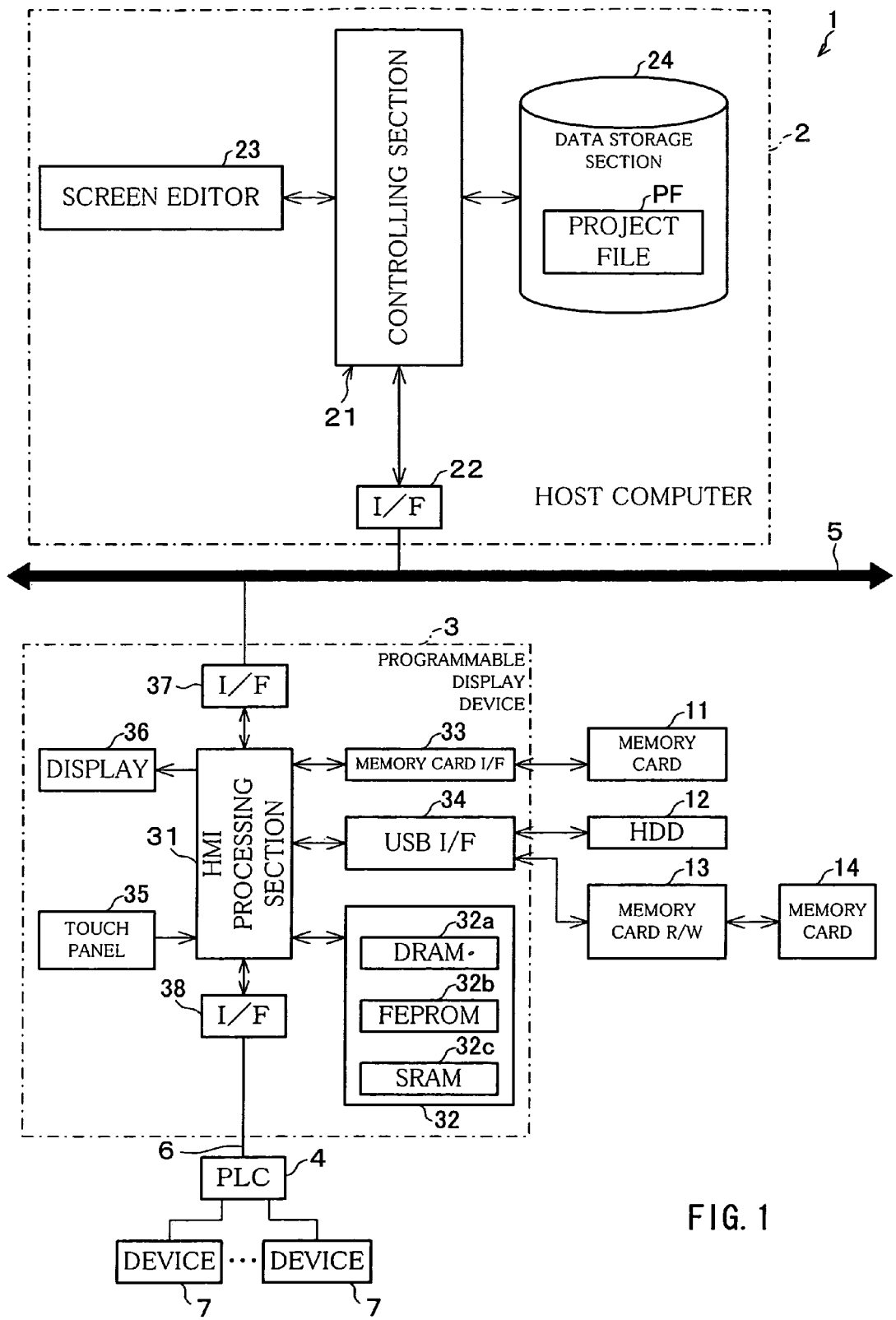
FIG. 1 is a block diagram illustrating an arrangement of a controlling system including the programmable display device according to one embodiment of the present invention.

As illustrated in FIG. 1, a controlling system 1 according to the present embodiment includes a host computer 2, a programmable display device 3, a PLC 4, a common network 5, an exclusive network 6, and a device 7.

The host computer 2 and the programmable display device 3 are connected with each other via the common network 5. On the other hand, the programmable display device 3 and the PLC 4 are connected with each other via the exclusive network 6. The common network 5 is a network such as a local area network (LAN) constituted of Ethernet™ and the like, by which it is possible to communicate through use of a common communication protocol. The exclusive network 6 is a network constituted of a serial cable and the like, by which it is possible to communicate through use of a communication protocol exclusive to the PLC 4 (an exclusive communication protocol). Because the PLC 4 has developed from a sequencer, much of the exclusive communication protocols differ from one another between machine-types of the PLC 4, e.g. differ according to manufacturing companies or to productions, even if the productions are made by the same company.

The controlling system 1 according to the present embodiment connects the programmable display device 3 and the host computer 2 via the common network 5, the programmable display device 3 being connected with the PLC 4, and adopts a common protocol as the common communication protocol used in the common network 5, the common protocol being determined independently of the exclusive communication protocol. Further, as mentioned later, the programmable display device 3 has a function for converting a protocol, and, for example, performs a protocol conversion such as a conversion of a command code, a conversion of an argument code, or a conversion of a controlling code in transmission, so as to relay communication between the host computer 2 and the PLC 4 connected to the programmable display device 3.

In such a structure, the programmable display device 3 functions as an HMI (human machine interface) and accordingly has a reserve capacity in its computing power compared with the PLC 4. Therefore, the programmable display device 3 processes much of the communication. It is possible to directly communicate from the host computer 2 to the programmable display device 3 without mediation by the PLC 4, and an example of which is a download of screen data. Therefore, a burden on the PLC 4 can be reduced, so that a computing ability necessary for the whole of the controlling system 1 can be reduced. Note that while waiting for an input from an operator, the programmable display device 3 has a reserve capacity, such that it can perform protocol conversion without requiring an increase in the computing ability for protocol conversion.

Further, the programmable display device 3 may be arranged so as to be connected with the host computer 2 via a screen transfer cable (not shown). The screen transfer cable is used for transferring, to the programmable display device 3, screen data formed in the host computer 2 as mentioned later, and can be a USB (Universal Serial Bus) cable and the like. The screen creation software (a screen editor 23) is installed in the host computer 2, and the host computer 2 is connected with the programmable display device 3 via the screen transfer cable, when the screen data formed as mentioned later is transferred. On the other hand, during a time of operation of the controlling system 1 when the programmable display device 3 and the PLC 4 communicate with each other, the connection between the host computer 2 and the programmable display device 3 via the screen transfer cable is shut off.

The PLC 4 as a controlling device receives output data from a device 7 for input via an input unit, and on the other hand provides controlling data to a device 7 for output, according to a controlling program (a ladder program) made by a user. Examples of the device 7 for input are devices such as sensors (e.g. a temperature sensor and a light sensor) and switches (e.g. a push button switch, a limit switch and a pressure switch). Examples of the device 7 for output are devices such as an actuator, a relay, an electromagnetic valve and a display device. Such devices 7 are disposed in appropriate parts of target systems such as a production line. Further, the device 7 may be arranged so as to be a particular region in a later-mentioned memory section 32 for storing data inputted by manual operation from an input device such as a later-mentioned touch panel 35.

A memory in the PLC 4 (a device memory) stores data such as a condition of the device 7 or an assigning value of the device 7 (e.g. word data or bit data) in a region specified by a device address. In the memory, a word device is set as a region for storing word data whose data for input/output is a numerical value, and is specified by a word address (a device address). Further, a bit device is set as a region for storing bit data such as an on/off condition, and is specified by a bit address (a device address). With such setting, it is possible to control the devices 7 or to take out respective information items about conditions of the devices 7, simply by accessing an arbitrary word device or bit device in the PLC 4.

The device address is referred to as an address hereinafter ad libitum.

The programmable display device 3 is a computer having a processor such as a CPU, and executes a program (screen data) made by a user for allowing input operation and display, so as to realize an operational function and display function exclusive to a programmable display device. The programmable display device 3, which is preferably used as an HMI of the controlling system 1, determines an action of displaying on a screen a condition of the device 7, or an action of controlling the condition of the device 7 according to an operation performed on the screen, based on screen data determined by combining later-mentioned process-indicating words (tags). The programmable display device 3 has a function of communicating with the PLC 4 via the exclusive network 6 so as to acquire conditions of each device 7 whose condition is to be displayed on a display screen via the PLC 4 connected to the programmable display device 3, and of displaying the conditions of each device 7 on, for example, a later-mentioned display 36. Further, the programmable display device 3 has a function of instructing condition control to the device 7 according to an operation performed on a later-mentioned touch panel 35.

Note that the programmable display device 3 may be such that it instructs acquisition of/change in the condition of the device 7 on a case-by-case basis, or may be such that the programmable display device 3 includes a cache and accesses it when the condition of the device 7 is to be acquired/changed, and at the same time communicates with the PLC 4 with respect to each predetermined interval or each predetermined event, so as to synchronize an entity of the device address.

In order to achieve the above function, the programmable display device 3 includes an HMI processing section 31, a memory section 32, a memory card interface section (a memory card I/F in the figure) 33, a USB interface section (a USB I/F in the figure) 34, a touch panel 35, a display 36 and interface sections (I/Fs in the figure) 37 and 38. Main sections of the programmable display device 3 are fully explained below.

The memory card interface section 33 is a reader/writer for reading out/writing in data from and to a memory card 11. As the memory card 11, a CF™ card with a small size and large capacity is preferable.

The USB interface section 34 is an interface for connecting a device having a USB (Universal Serial Bus) standard, and is constituted of a USB host controller that is a controlling device of a USB host-end device. A hard disc drive (HDD in the figure) 12 and a memory card reader/writer 13, which are USB devices, are connected with this USB interface section 34, and these USB devices may be connected through a USB hub (not shown).

The touch panel 35 is an input device provided for performing input operations on a display screen of the display 36. As the display 36, a flat type display such as a liquid crystal display or EL display is preferably used, so that the programmable display device 3 is made thin.

The interface section 37 is a communication controlling section by which the programmable display device 3 communicates with the host computer 2 and the like on the common network 5, and connected with the common network 5. By communication via this common network 5, data transmission is performed between the programmable display device 3 and the host computer 2. On the other hand, the interface section 38 is a communication controlling section by which the programmable display device 3 communicates with the PLC 4, and connected to the exclusive network 6. With communication via this exclusive network 6, data transmission is performed between the programmable display device 3 and the PLC 4.

In a communication system with the above structure, output data from the PLC 4 is transmitted to the programmable display device 3, and via the programmable display device 3, sent on to the host computer 2 or other devices (not shown in the figures) connected with the common network 5. Further, not only data set in the programmable display device 3 is directly transmitted to the PLC 4, but also assigning data transmitted from the host computer 2 or other devices is sent on to the PLC 4 via the programmable display device 3 connected with the PLC 4.

The HMI processing section 31 performs a variety of data processing, in order to perform later-mentioned display control of a user screen and a protocol conversion process.

When the networks 5 and 6 have communication protocols different from each other, the protocol conversion process converts one communication protocol to the other communication protocol, based on later-mentioned protocol transformation data stored in a FEPROM 32b. The protocol conversion process is realized by a protocol conversion program stored in the memory section 32 being carried out by operation processing means such as a CPU. A display controlling process (display controlling function) is fully mentioned later.

The memory section 32 includes a memory such as a DRAM 32a, a FEPROM (Flash Erasable and Programmable ROM) 32b, and an SRAM 32c.

The DRAM 32a is used for temporarily storing data transmitted and received between the memory section 32 and the PLC 4, as well as mainly for operation processing such as display control. Particularly, the DRAM 32a includes a state-memory region for transmitting to and receiving from the memory of the PLC 4 a condition of the device 7 (contents of the device address) stored in the memory of the PLC 4.

The SRAM 32c is used for logging data obtained from the PLC 4 and for storing data (recipe data) to be given to the PLC 4.

The FEPROM 32b is a flash memory that is read-only yet rewritable, and serves as a hard disc drive in a general personal computer. The flash memory does not have a movable section and is resilient to shock, allowing it to function stably even in a non-ideal environment.

Figure 2:
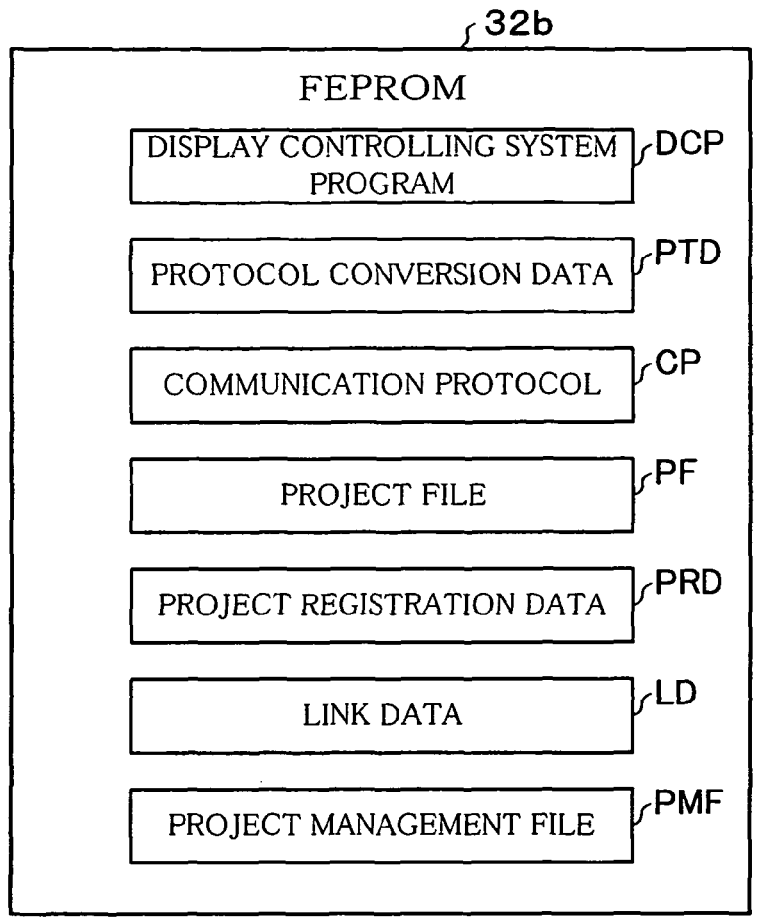
FIG. 2 is a view illustrating a program and data stored in a FEPROM of the programmable display device.

Further, as illustrated in FIG. 2, the FEPROM 32b includes areas for respectively storing a display controlling system program DCP, protocol transformation data PTD, a communication protocol CP, a plurality of project files PF, project registration data PRD, link data LD, and a project management file PMF.

The display controlling system program DCP realizes a basic function for performing image display control. The function that the display controlling system program DCP realizes in the HMI processing section 31 is fully explained later.

The protocol transformation data PTD may have any form as long as the data can perform reciprocal conversion of the communication protocols of the exclusive network 6 and the common network 5. In the present embodiment, the protocol transformation data PTD stores: a data-transfer format indicative of a format of data transmitted by the exclusive network 6; and a command conversion table indicative of a correspondent relation between command codes transmitted respectively by the networks 5 and 6.

The communication protocol CP (exclusive communication protocol) is used for a communication process with the PLC 4, and is set exclusive to each machine-type (maker) of the PLC 4. The communication protocol includes a command code which instructs reading out of data to the PLC 4. This command code is combined with the address corresponding to a controlling function of the PLC 4, so as to transmit data regarding a desired controlling function to the PLC 4.

The project file PF is a collective entity (screen data group) of data (screen file) of a plurality of screens (unit screens) displayed on the programmable display device 3. It is fully mentioned later (see FIG. 4). Each screen data includes data of a base screen and parts to be displayed on the display 36, and a later-mentioned process-indicating word W that is given to each part. The project file PF and each screen file constituting the project file PF are created by a later-mentioned screen editor 23 and stored in a storage device (storage medium) provided as an internal or external storing section of the programmable display device 3. The programmable display device 3 selects screen data from the project file PF and displays it.

The screen data is constituted of a figure data section and an address data section. The figure data section includes figure data (e.g. a circle and a quadrangle), data of parts, character strings, process-indicating words W and the like. The address data section includes addresses and comments corresponding to the addresses, both of which are set by the screen editor 23. The addresses correspond to data in the figure data section, such as the data of parts or the process-indicating words W.

Examples of the comments are as follows: a name of an event such as an operating condition of a device; a sign corresponding to the device 7, such as SW corresponding to a switch or LAMP corresponding to a lamp; and an operational instruction. Further, the comment can be used as a variable. The thus defined comment corresponds in advance to the above-mentioned device address corresponding to the device 7.

The project registration data PRD registers, as screen data group information, the project file name of a project file PF displayed on the programmable display device 3, and information of a device name for specifying the storage section which stores the project file PF, as a device (including a memory device) with which the programmable display device 3 can communicate. The controlling system illustrated in FIG. 1 registers, as the above device, the FEPROM 32b, the memory card interface section 33 (the memory card 11), the hard disc drive 12, the memory card reader/writer 13 (the memory card 14), and the data storage section 24 (the host computer 2).

The link data LD is information for showing, by use of a network address, a location of a project file PF for displaying, in a list style, a selection screen of the project files PF (see FIGS. 6 and 8) displayed by a later-mentioned project setting processing section 31b, and a location of an interface of a storage device or a storage medium that serves as a storage section for storing the project file PF, and for linking each storing section. The link data LD is, for example, short-cut data. This link data LD is stored together in the FEPROM 32b provided as a location information storing section. It is preferable that link data LD is stored as shot-cut data, because consumption of memory capacity is low. Note that the link data LD may be stored together in an external arbitrary storage medium such as the memory card 11, instead of the FEPROM 32b.

In order to cause a plurality of project files PF to function as a single unified project file PF, the project management file PMF stores information for managing the plurality of the project files PF. This project management file PMF includes as information a project file name and a range (screen number) of screen files used in each project file PF.

Figure 3:
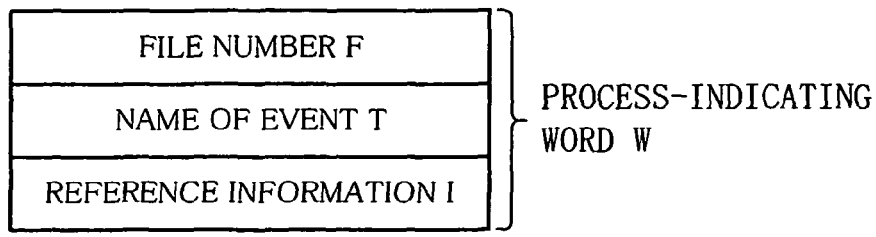
FIG. 3 is a view illustrating a basic format of a process-indicating word included in screen data that is data of a screen displayed by the programmable display device.

As illustrated in FIG. 3, the process-indicating word (tag) W is formed with respect to each event to be executed on the base screen. This process-indicating word W basically includes a file number F of a base screen for carrying out a display controlling operation, a name-of-event T for specifying operation contents to be carried out on this base screen, and reference information I constituted of one or more pieces of data that is referred to with respect to each event to be executed, the file number F, the name-of-event T and the reference information I forming a set.

In the programmable display device 3 according to the present embodiment, as the tag, two tags are specified: one is a display tag for indicating a correspondence between a region on the base screen (a display range) and the device address of the device 7 corresponding to display on the region, and the other is an input tag for indicating a correspondence between a region on the screen (an input range) and an address corresponding to a touch input performed on the region. Further, in the present embodiment, each tag can be connected with at least one of a plurality of unit screens.

Coupled with the operation on the touch panel 35, the display tag makes it possible to display a predetermined figure at a corresponding position on the base screen. Namely, the display tag includes a file number of a base screen as the file number F, includes a name of an event which specifies display of a display object (e.g. a figure) as the name of an event T, and includes a display coordinate range of the display object, a file number for specifying the display object to be called back, and the address for referring to the display object in display as the reference information I.

Further, coupled with a touch operation on the touch panel 35, the input tag makes it possible, for example, to invert a bit device set in a predetermined address position in the above-mentioned state-memory region provided in the DRAM 32a. Namely, the input tag includes a file number of a unit screen as the file number F, includes a name of an event which specifies an operation of the touch panel 35 as the name-of-event T, and includes, as the reference information I, an input coordinate range which enables an input operation from the touch panel 35, and an address whose data is to be rewritten, coupled with the touch operation on the touch panel 35.

Figure 4:
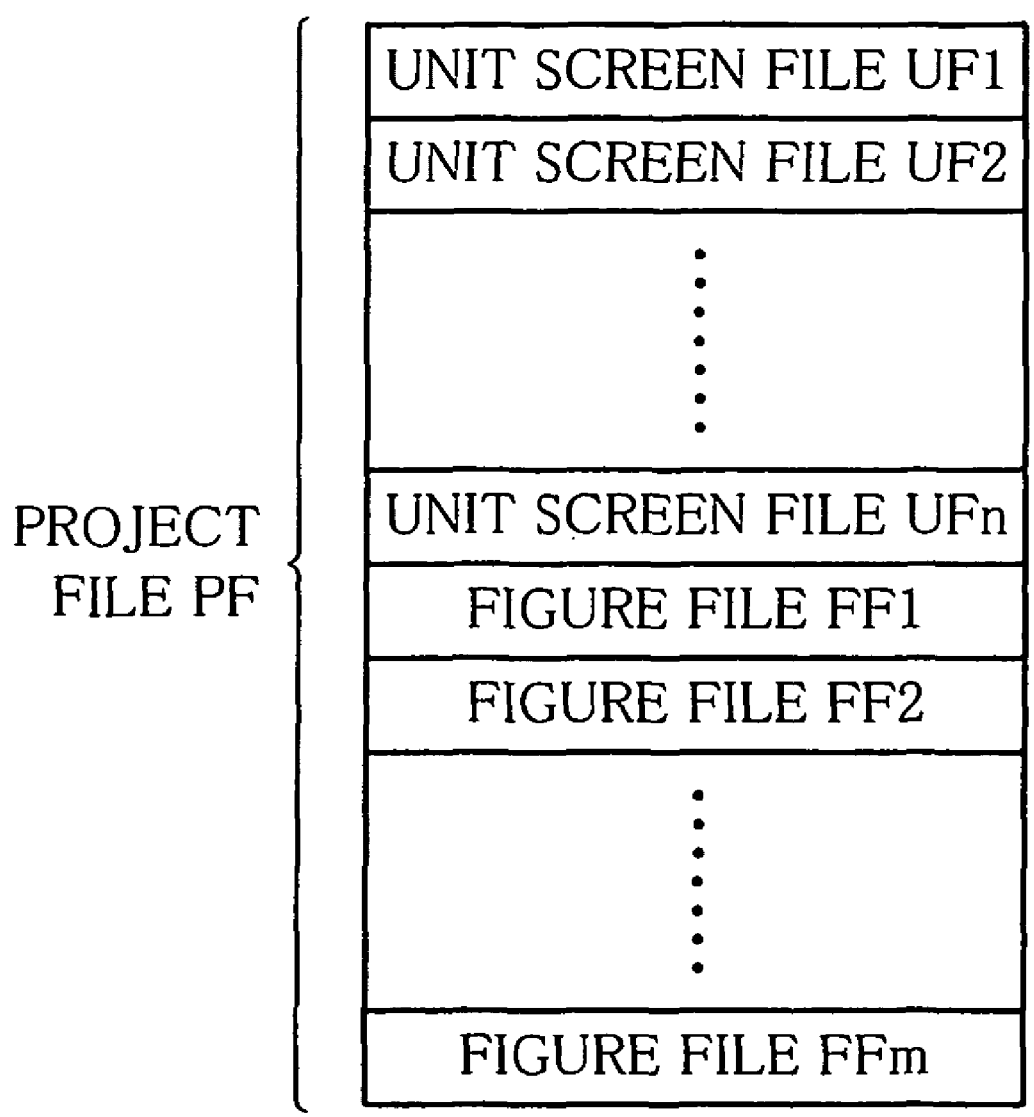
FIG. 4 is a view illustrating an arrangement of a project file stored in the FEPROM.

As illustrated in FIG. 4, a screen file is constituted of a project file PF which is made of: one or more unit screen files, such as UF1, UF2, ... , UFn (when unit screens are referred as a whole, they are referred to merely as 'UF' hereinafter); and related figure files FF1, FF2, ... , FFm to be called back from each unit screen UF and displayed. In the project file PF, each unit screen file UF is hierarchically connected with one another. For example, from the unit screen file UF1 which becomes a main screen, the unit screen file UF2 is called back, and from this unit screen file UF2, the unit screen file UF3 is called back. Further, the unit screen file UF is constituted as one unit screen file UF, with data items indicative of each display factor on the base screen being put together.

The display controlling function of the HMI processing section 31 is a function for realizing: display of the screen data; setting of a variety of data items to the user screen; transmission of thus set data items to the PLC 4; and display of data items received from the PLC 4 on the user screen, by causing the operation processing means (e.g. CPU) included in the programmable display device 3 to carry out the above-mentioned display controlling system program. This display controlling function extracts from the screen data a display tag related to a unit screen currently displayed, reads out contents of device addresses related to each display tag with respect to each cycle predetermined by each display tag, and displays parts and the like in a display-style specified by the display tag, on a specified region on the screen, in a style according to a read out value.

On the other hand, the display controlling function accepts input operations on the touch panel 35, searches, from the screen data, for an input tag which corresponds to the unit screen currently displayed and which matches the input operation, and rewrites the content of a device address (data stored in a memory region specified by the device address) indicated by the input tag according to the result of input. As a result, the programmable display device 3 can display the condition of the device 7 indicated by the screen data, in a display style indicated by the screen data, at a display position (e.g. a part) indicated by the screen data, and control the condition of the device 7 according to the input operation by a part and the like in the display data. Next, this display controlling function is fully explained.

Figure 5:
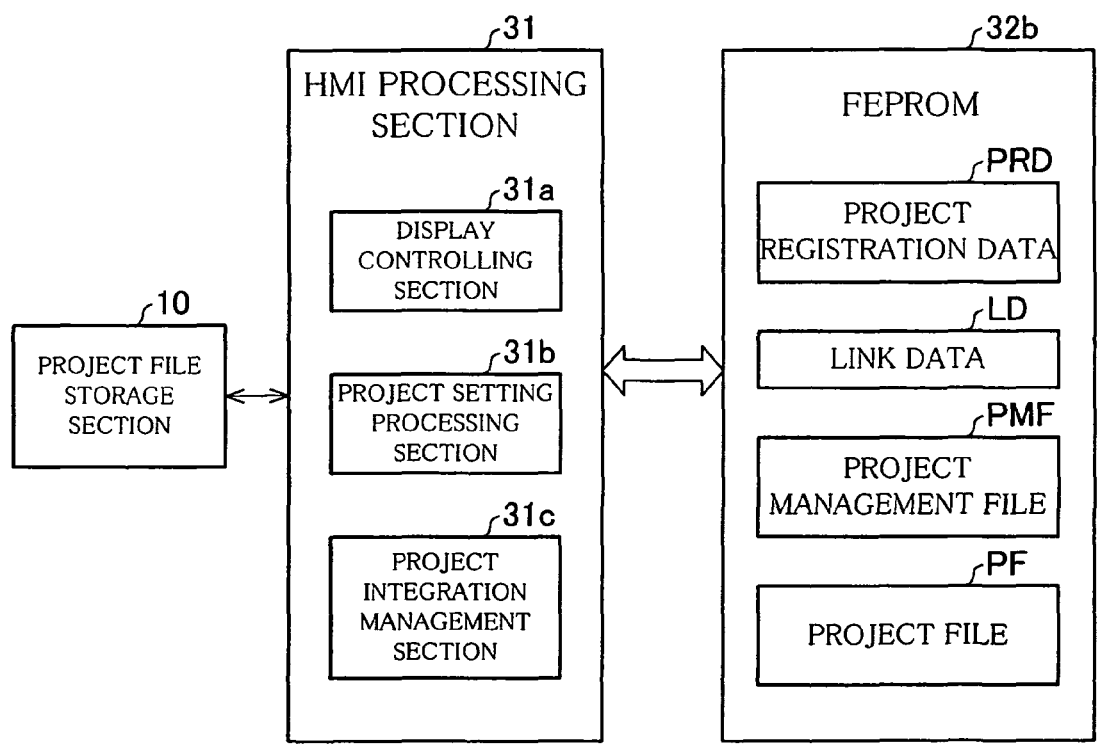
FIG. 5 is a block diagram illustrating an arrangement of a main section including an HMI processing section that is a center of control of the programmable display device.

As illustrated in FIG. 5, the display controlling function realized in the HMI processing section 31 includes a display controlling section 31a, a project setting processing section 31b, and a project synthesis processing section 31c.

The display controlling section 31a carries out a process for displaying parts on the base screen, using the base screen data and part data included in the screen data. Further, the display controlling section 31a displays device data obtained from the PLC 4 on an appointed region on a predetermined base screen, using parts for data display (such as a meter display device, a numerical value display device, and a graph display device). In displaying, a user screen is illustrated on the display 36, based on the screen data, by use of VRAM and the like. Further, the display controlling section 31a selects screen data from a project file PF which is set by the project setting processing section 31b in a later-mentioned manner.

The project setting processing section 31b provides a list switching mode and an automatic switching mode as a switching mode of the project file PF.

Figure 6:
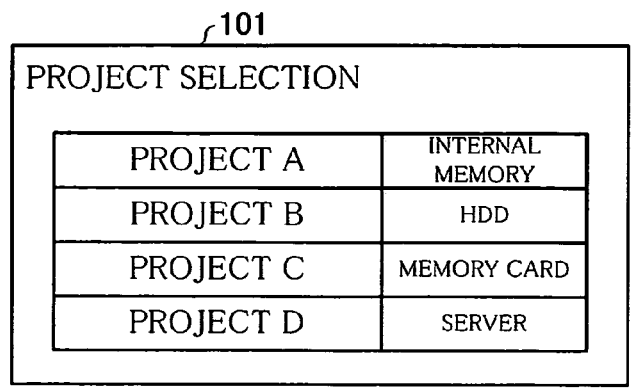
FIG. 6 is a view illustrating a project selection menu screen for switching project files displayed on the programmable display device.

In the list switching mode, the project setting processing section 31b provided as a selection information forming section displays, with time restriction (1 through 60 seconds), a project selection menu screen 101 illustrated in FIG. 6, as selection information, when power is applied to the programmable display device 3. The project selection menu screen 101 includes a list of names of previously registered project files and storage locations of the project files.

Based on the project registration data, the project setting processing section 31b searches, as the storage location, the FEPROM 32b of the programmable display device 3 and the project storage section 10 connected with the programmable display device 3, and when the project setting processing section 31b recognizes the project file PF (reads out project file name), adds the project file PF (concretely, the project file name and the storage location) to the list, as a project file PF that is able to be selected. Further, the project setting processing section 31b can not recognize the project file PF when the result of searching a registered storage location shows that the storage location is not able to communicate with the programmable display device, such as when the storage location is not connected or when the storage location does not function, and therefore does not display the project file name and the storage location in the list.

As the project storage section 10, the memory card interface section 33 (the memory card 11), the hard disc drive 12, the memory card reader/writer 13 (the memory card 14) and the data storage section 24 (the host computer 2) are registered.

Note that the project setting processing section 31b may be arranged so that by provision of a button for displaying the project selection menu screen 101 on a predetermined screen, the button is operated not only when power is applied to the programmable display device 3, but also when the programmable display device 3 is in operation, and thereby the project selection menu screen 101 is displayed. At that time, the project setting processing section 31b has performed a search for program files when power was applied to the programmable display device 3, and therefore does not perform a search again, and displays the project file name and storage location on the list, based on a result of the search.

The project setting processing section 31b searches the FEPROM 32b and the like where the link data LD is stored, and when the link data LD is recognized, adds to the list a project file PF corresponding to the link data LD as a project file PF that is possible to be selected in the list, and displays the project file PF, instead of searching an actual storage location. As a result, the project setting processing section 31b can display a list of storage locations previously provided in design, even when a project file PF cannot be recognized in a storage location as described above. Further, by searching the link data LD, it is unnecessary to search each storage location, so that it is possible to shorten the time for a search.

When a section displaying a project file name in the list is touched by the user, the project setting processing section 31b switches setting from a default project file PF to the specified project file PF, and reads the project file PF from the storage location to the DRAM 32a.

Alternatively, the project setting processing section 31b may be arranged so as to provide other list switching modes in an off-line mode.

The off-line mode is a state in which the programmable display device 3 shuts off data communication with the PLC 4, and is a mode in which the HMI processing section 31 performs a variety of settings or operations. When two predetermined points in opposing corners out of four corners on a display screen in the on-line mode are touched, a menu bar is displayed. By selecting the off-line mode from the menu bar, a transition to the off-line mode is performed. Alternatively, it may be arranged so that by selecting a password input from the menu bar, a window for requesting a password is displayed, and by inputting a registered password, a transition to the off-line mode is performed.

Figure 7:
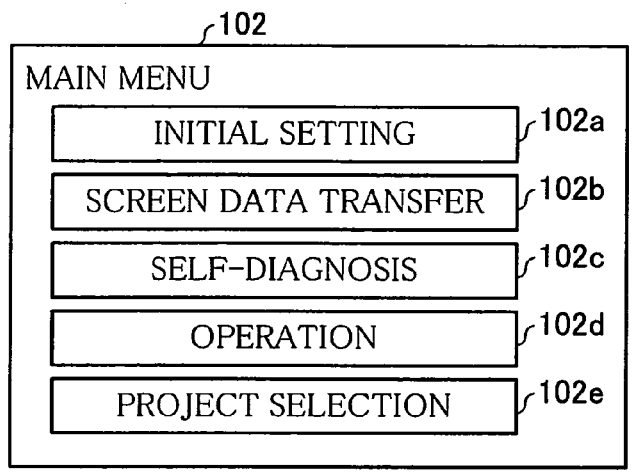
FIG. 7 is a view illustrating a main menu screen displayed in an off-line mode of the programmable display device.

When the transition to the off-line mode is performed, the programmable display device 3 displays a main menu screen 102 as illustrated in FIG. 7. This main menu screen 102 includes a default setting button 102a, a screen data transfer button 102b, a self-diagnosis button 102c, an operation button 102d and a project selection button 102e.

The default setting button 102a is a button to be operated when a variety of setting items necessary for operating the programmable display device 3 (e.g. a system environment, I/O, memory initialization) are set. The screen data transfer button 102b is a button to be touched when screen data is transferred from the screen editor 23 to the programmable display device 3. The self-diagnosis button 102c is a button to be operated in transition to a mode for self-diagnosing whether there is abnormality in each section of the programmable display device 3. The project selection button 102e is a button to be operated when a project file PF is selected and switched.

Figure 8:
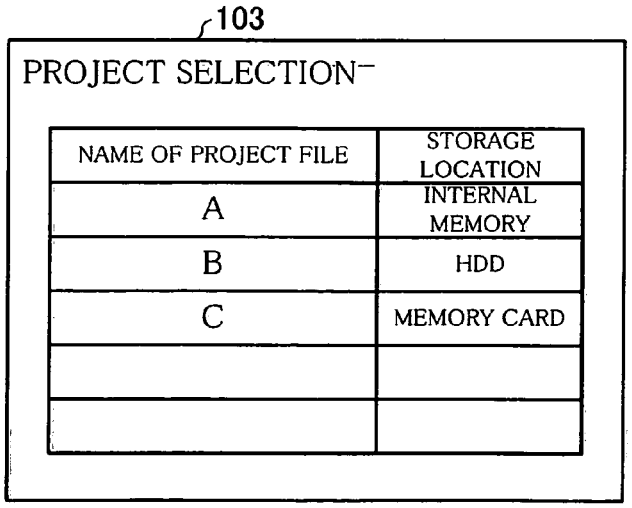
FIG. 8 is a view illustrating a project selection screen for switching project files displayed in the off-line mode of the programmable display device.

When the project selection button 102e is touched, the project setting processing section 31b displays a project selection screen 103 illustrated in FIG. 8 as selection information. The project selection screen 103 includes a list of names of previously registered project files and storage locations of the project files PF. As with the case of displaying a list in the project selection menu screen 101, the project setting processing section 31b searches, based on project registration data PRD, the project storage section 10 provided as the storage location connected with the programmable display device 3, and when project files PF are recognized, displays a list of project files PF with their project file names and storage locations. Further, when a section displaying a project file name is touched by the user in list display of the project selection screen 103, the project setting processing section 31b switches the setting from the default project file PF to the specified project file PF, and reads the project file PF from a storage location to the DRAM 32a.

Using the project selection menu screen 101 allows a worker who operates the programmable display device 3 to switch project files. This switching is suitable for a case where it is necessary for the worker on site to switch project files according to switching of production lines. Therefore, it is intelligible and preferable to the worker to replace the project file name displayed on the project selection menu 101 with a name of a product produced by a switched production line.

Using the project selection screen 103 can prevent the worker who operates the programmable display device 3 from switching project files. This is because only limited persons such as a system administrator can operate the programmable display device 3 in the off-line mode (access being limited by a password), for the reason that in the off-line mode, initial setting needs to be performed. Therefore, the project selection screen 103 is suitable for a situation in which it is difficult for the worker to judge whether switching is to be performed or not, because the number of project files to be switched is large.

The project setting processing section 31*b* in the automatic switching mode switches the project files PF according to switching of ladder programs in the PLC 4. To be specific, switching is carried out with arrangements illustrated in FIGS. 9(*a*) and 9(*b*).

In the arrangement illustrated in FIG. 9 (*a*), sets comprised of a project switching bit SB (SB1 through SBn) and a project file name (for example, projects PJ1 through PJn) are allotted to all the project files PF in a predetermined memory region 41 in the PLC 4. Further, in the PLC 4, a ladder program execution processing section 42 executes a selected one of ladder programs P1 through Pn (when an arbitrary ladder program is referred to, it is merely referred to as a "ladder program P") stored in a program memory 43.

Further, each ladder program P includes in its head part a bit switching command for switching the project switching bit SB corresponding to each ladder program P from "0" to "1", and includes in its tail part a bit switching command for switching the project switching bit SB corresponding to each ladder program P from "1" to "0". The bit switching command includes a memory address of a region where the project switching bit SB is stored, and the memory address specifies the corresponding project switching bit SB from the ladder program P. This project switching bit SB changes from "0" to "1", and thereby functions as specifying information for showing that the ladder program P is specified.

As a result, when a ladder program P is executed, a bit switching command included in the head part of the ladder program P switches a corresponding project switching bit SB from "0" to "1". The project setting processing section 31*b* scans a state of each project switching bit SB, reads out a project file name corresponding to the project switching bit SB that has changed to "1", switches setting to a project file PF having this project file name, and reads the project file PF from the project file storage section 10 (storage location) to the DRAM 32*a*.

Further, when the execution (1 scan) of the ladder program P is finished, the bit switching command included in the tail part of the ladder program P switches the corresponding project switching bit SB from "1" to "0". As a result, the project setting processing section 31*b* scans each project switching bit SB, reads out the project file name corresponding to the project switching bit SB that has changed to "0", and stops using the project file PF.

However, when the same ladder program P is executed plural times, the same project switching bit SB is switched from "0" to "1" again. In such a case, the project setting processing section 31*b* reads out the same project file name as the project file name that has been read out in a previous time from the memory region 41. Therefore, the project setting processing section 31*b* compares the project file name that has been read out in a previous time with the project file name that is read out in a present time, and when both names are the same, decides to use the same project file PF and does not switch project files PF. Therefore, in this case, the project file PF that has been read in by the DRAM 32*a* is used.

With the arrangement, when the ladder programs P executed in the PLC 4 are switched, the project files PF used in the programmable display device 3 are automatically switched according to the switching of the ladder programs P. Therefore, it is unnecessary for the user to perform a switching operation of the project files PF.

In the arrangement illustrated in FIG. 9 (*b*), sets comprised of a project switching bit SB and a project file name (for example, projects PJ1 through PJn) are allotted to all the project files PF in a predetermined memory region (for example, a predetermined region of the DRAM 32*a*) of the memory section 32 in the programmable display device 3. This arrangement is different from the arrangement of FIG. 9(*a*) in that the sets comprised of a project switching bit SB and a project file name are stored in the memory section 32 instead of in the memory region 41 in the PLC 4. However, as a process of the project setting processing section 31*b*, scanning of the project switching bit SB to the memory section 32 and reading out of the project file name from the memory section 32 are performed in the same manner as when scanning of the project switching bit to the memory region 41 and reading out of the project file name from the memory region 41 are performed, and therefore automatic switching of a project file just like FIG. 9(*a*) is realized.

Further, the project setting processing section 31*b* may be arranged so as to switch project files PF according to an instruction from, for example, the host computer 2 under a circumstance where the programmable display device 3 is connected with the common network 5 (LAN) as shown in FIG. 1. As a result, a process can be performed, in which a plurality of programmable display devices 3 are connected with the common network 5, and project files PF used in each programmable display device 3 are switched simultaneously. In the arrangement, when the PLC 4 is LAN-based and is connected with the common network 5, it is possible for the host computer 2 to instruct the PLC 4 to switch ladder programs, and at the same time to instruct each of the programmable display devices 3 to switch to a project file PF corresponding to the switched ladder program P.

Figure 10:
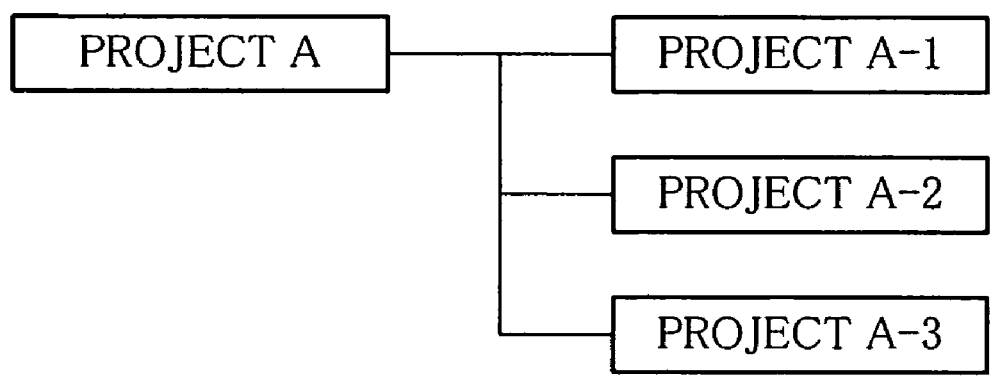
FIG. 10 is a view illustrating a state in which a plurality of project files are integrated with each other by a project integration management section provided in the programmable display device.

The project integration management section 31*c* carries out a process for integrating project files PF into one project file by an integration project file including the project management file, so that a plurality of project files PF stored in the FEPROM 32*b* can be dealt with as a single project file PF. For example, as illustrated in FIG. 10, the project integration management section 31*c* integrates and manages individual project files PF such as projects A-1, A-2 and A-3 using a project management file (management information) referred to as project A, and an entities of the project files PF such as the projects A-1, A-2 and A-3 are the same as those before a integration process is carried out. Further, the project A does not have an entity as the project file PF, but instead appears to the user as a single project file PF including the projects A-1, A-2 and A-3.

The project integration management section 31*c* reads out the project file PF (the projects A-1, A-2 and A-3) specified by the display controlling section 31*a* from the FEPROM 32*b*, based on the project management file (the project A in FIG. 10).

Further, the project integration management section 31*c* may be arranged so as to integrate and manage a plurality of project files PF stored in an external device and a storage medium of the programmable display device 3. In this case, the project management file includes information for specifying a storage device (storage medium) acting as a storage location of each project file PF. As a result, the project integration management section 31c reads out a project file PF to be read out in the integration project file from a specified storage location (the FEPROM 32b and the project file storage section 10).

When the number of screens to be created in a system is large, it is difficult for one person in charge to create screens. Outsourcing of creation of a portion of screens is conceivable. In outsourcing, it is necessary to gather each project file PF created by respective persons in charge for one system. As shown above, with the project integration management section 31c, a plurality of project files PF are integrated and managed as if they were one project file PF, so that creation of the project files PF is performed separately and thereby working efficiency can be increased. Further, before an integration process, the project files PF are copied by the storage medium such as a memory card, operation check of the project files PF are performed in the programmable display device 3, and the project files PF are modified by the screen editor 23 according to necessity, and thereby modification after the integration process can be avoided.

The HMI controlling section 31 is a part of a function block that is realized by a display controlling system program DCP (display controlling program) being executed by a calculation processing section such as a CPU. This display controlling system program DCP can be stored in a storage medium that is formed so as to be detachable from the programmable display device 3, and installed from the storage medium (program media) to the programmable display device 3.

The preferable examples of the storage medium are as follows; tapes such as an electromagnetic tape and a cassette tape, magnetic discs such as a flexible disc and a hard disc, optical discs such as CD-ROM, MO, MD and DVD, and cards such as an IC card (including a memory card) and an optical card. In addition, the program media may be a medium permanently storing a program. The examples of the program media are as follows; mask ROM, EPROM, EEPROM and flash ROM.

Further, when the present controlling system 1 has a system structure that can connect with a communication network including the Internet, the program media may be a medium temporarily storing a program, so as to allow download of the program from the communication network. However, in a case of downloading a program from the communication network in this way, a program used for downloading may be stored in the host computer 2 beforehand, or may be installed from other storage medium.

Next, the host computer 2 is explained. As with a general multipurpose personal computer, the host computer 2 includes a CPU, a memory (such as RAM and ROM), an external storage device (such as a hard disc drive and an MO drive), a display device and an input device (such as a key board and a mouse). Further, as illustrated in FIG. 1, the host computer 2 includes a controlling section 21, an interface section (shown as I/F in the figure) 22, an screen editor 23 and a data storage section 24.

The interface section 22 is a communication controlling section for communicating with the programmable display device 3, and is connected with the common network 5.

The controlling section 21 is a section including a CPU and a memory, for performing an operation process, and executes, on an operating system, the screen editor 23 that is an application program. The host computer 2 serves as a screen forming device by causing the controlling section 21 to carry out the screen editor 23.

In order to form the user screen exclusive to the user, the screen editor 23 includes parts such as a switch, a lamp, a numeric keypad, a variety of display devices (e.g. a numerical value display device, a meter display device and a graph display device), a variety of tag setting functions, drawing functions and text input functions. The provided parts are not only single-function parts, but also plural-function parts such as a complex switch, a counter and a timer, having a plurality of functions. Parts as display factors are registered in a library-form so that the user can easily select them, and input tags and display tags according to functions of the parts are given beforehand. The drawing function is a function for drawing a line figure (a figure factor) such as a line or a curve, and for daubing with appointed colors and patterns the drawing and figure of a base figure (a figure factor) such as a circle, a quadrangle, and a triangle. Further, the screen editor 23 puts together data items indicative of each display factor constituted on the base screen and constitutes one unit screen file UF, and at the same time puts together a plurality of unit screen files UF and constitutes the project file PF.

The user disposes a selected part on the base screen with an operation such as a drag and drop from a displayed list of parts, or changes the size of the part. Further, using a drawing function, the user daubs a lineal drawing (most of which are lines or curves), the inside of the lineal drawing, or the inside of a basic figure, with a predetermined color or pattern, in substantially the same manner as conventional screen creation software, so as to form an arbitrary drawing figure on the base screen. Further, by using the tag setting function, the user selects a process-indicating word W having a necessary function out of process-indicating words provided by the programmable display device 3, and sets the process-indicating word W to an arbitrary figure drawn on the base screen, so as to form a new part different from the above part provided in advance in the screen editor 23.

Here, the management of the project file PF in the controlling system 1 with the arrangement is explained.

First, when power is applied to the programmable display device 3 during start-up of the controlling system 1, the project selection menu screen 101 illustrated in FIG. 6 is displayed as a default screen. When the user touches and selects a project file to be used from a list displayed on the project selection menu screen 101, the selected project file PF is set by the project setting processing section 31c, and read out from the FEPROM 32b or the project file storage section 10 to the DRAM 32a.

Further, when products are changed in a single production line and a change of the project file PF is needed in the list switching mode, the project selection menu screen 101 is displayed with a button operation of a predetermined screen, or transition to the off-line mode is performed and the project selection screen 103 illustrated in FIG. 8 is displayed, so that a project file PF is selected from a list display on a displayed screen. Then the selected project file PF is set by the project setting processing section 31b, and read out from the FEPROM 32b and the project file storage section 10 to the DRAM 32a.

Figure 9A:
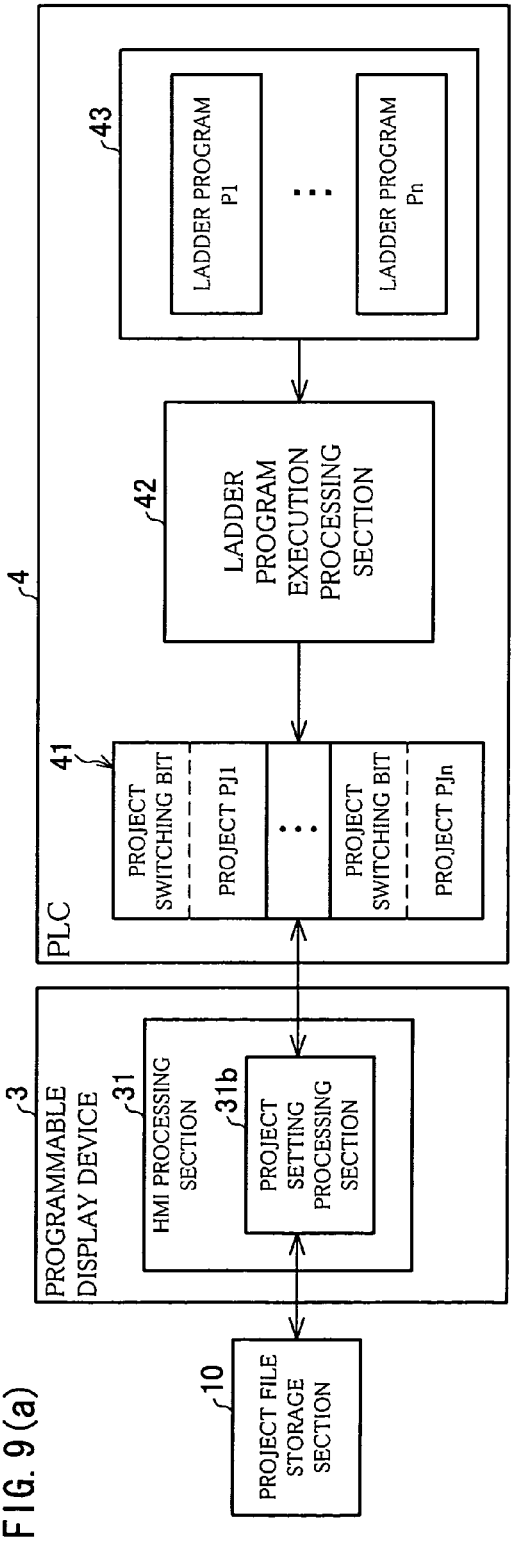
FIGS. 9(a) and 9(b) are block diagrams illustrating arrangements for automatically switching project files according to switching of ladder programs.
Figure 9B:
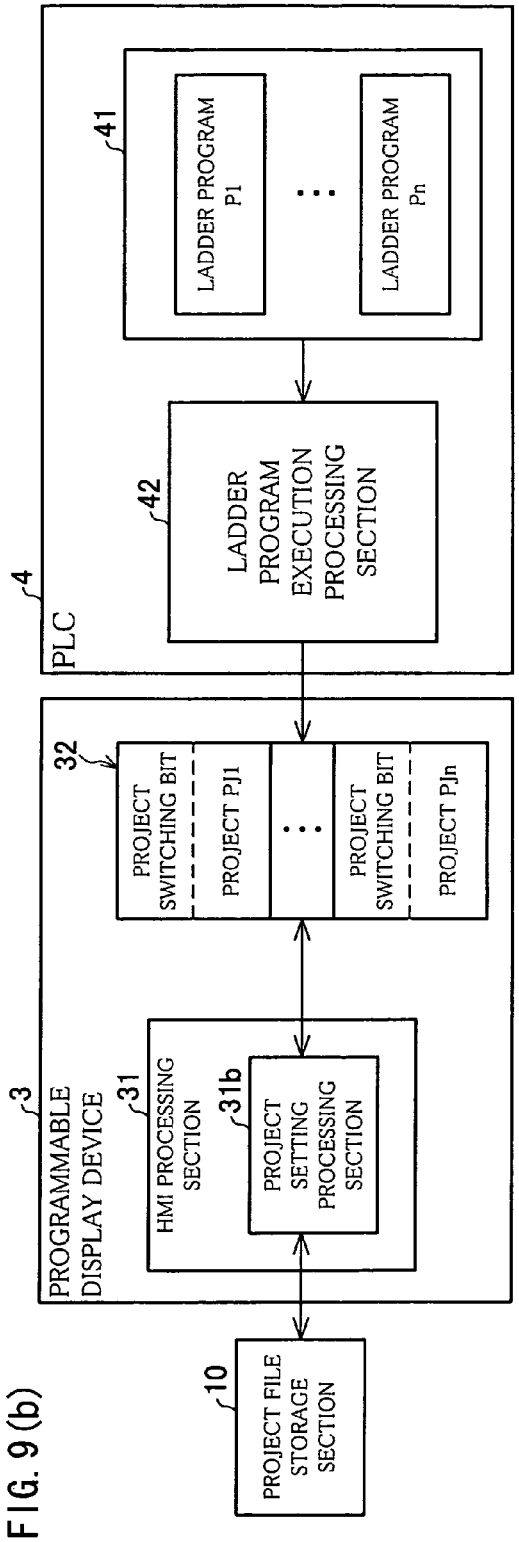

Alternatively, when a change of the project file PF is needed in the automatic switching mode, the ladder program P is switched with the arrangement illustrated in FIG. 9(a) or 9(b). Then, the project switching bit SB is accordingly switched from "0" to "1", and thereby the project setting processing section 31b reads out the project file name corresponding to the project switching bit SB, and reads in the project file PF having the project file name from the FEPROM 32b and the project file storage section 10 to the DRAM 32a.

As described above, in the controlling system 1, the programmable display device 3 includes the project setting processing section 31b, so that the project file PF stored in the programmable display device 3 and the project file PF stored in the external device such as the hard disc drive 12 and in the external medium such as the memory card 11 are switched and set. Therefore, it is unnecessary for one project file PF to include screens corresponding to all products in order to respond to a variety of products from a single production line for limited production of a wide variety of products, and instead project files PF corresponding to each product can be provided.

As a result, it is unnecessary for the programmable display device 3 to perform a complex screen management for switching screen files in one project file PF. Further, it is possible to provide the project file storage section 10 dispersed in the external recording device and the like, so that it is possible to separately manage a plurality of project files PF even when the capacity of the FEPROM 32b is small. Further, it is unnecessary to transfer, with respect to each switching of production lines, the project file PF corresponding to the switched production line, so that it is possible to promptly change a production line in response to a frequent change of products.

With the arrangement, the programmable display device 3 may be arranged so that when it can be connected with two PLCs 4, project files PF corresponding to each PLC are provided so that the project files PF are switched according to the switching of the PLCs 4. In this case, to be specific, with the arrangement illustrated in FIG. 9(a) or 9(b), the project setting processing section 31b switches project switching bits SB when the PLCs 4 are switched, and selects a project file PF corresponding to the project switching bit SB.

Further, in the controlling system 1, the programmable display device 3 includes the project integration management section 31c, so that a plurality of independent project files PF are managed as one integration project file. As a result, the project file PF to be formed as one project file PF is formed as a plurality of dispersed project files PF. Therefore, the development of a project file PF with a large size (with many screens) can be carried out more effectively.

Further, in the controlling system 1, the programmable display device 3 includes the link data LD, so that when the project setting processing section 31b displays the list of project files PF on the project selection menu screen 101 or the project selection screen 103, a search of the link data LD allows confirmation of a registered storage location. As a result, a period for searching becomes shorter than a period for searching the external storage location of the programmable display device 3, so that time for displaying the list can be reduced.

It may be that when the host computer 2 functions as a server of the controlling system 1, the project files PF are managed all together in the data storage section 24. As a result, it is unnecessary to transfer the project file PF to the programmable display device 3, so that repeated transfer can be omitted even when the same screen is changed. However, when the common network 5 is constituted of a LAN, the programmable display device 3 reads out screen data from the host computer 2 with respect to each time the programmable display device 3 switches screen display, with a result that switching of display becomes slow. Therefore, when the selected project file PF is temporarily read out from the data storage section 24 to the memory card 11 having large capac-ity, and screen data is read out from the memory card 11 every time the screen display changes, switching of display can be made faster.

Here, an overview of the present embodiment is explained.

The programmable display device 3 selects and displays one screen data item from one of screen data groups each constituted of a plurality of screen data items indicative of control conditions, the programmable display device including a selection information forming section (the project setting processing section 31b) for forming selection information (such as the project selection menu screen 101) used for selecting one of the screen data groups, based on screen group information concerning the screen data groups; and a screen data group setting section (project setting processing section 31b) for setting, as a screen data group to be used, the one of the screen data groups which is selected based on the selection information.

With the arrangement, the selection information forming section forms the selection information based on the screen data group information concerning the screen data groups (project file PF). The screen data group information includes, for example, names of the screen data groups, and these names are formed as the selection information in a list style. When the user selects a screen data group from the selection information, the screen data group setting section sets the screen data group as a screen data group to be used.

As a result, the screen data groups are switched and set, and thereby the screen data groups can be dispersed and managed in internal and external storage sections (such as the project file storage section 10). Therefore, it is unnecessary to cause a screen data group to include screens corresponding to all kinds of products so as to respond to a variety of products from a single production line for the purpose of enabling limited production of a wide variety of products. As such, it is sufficient to provide screen data groups corresponding to each product.

It is preferable that in the programmable display device 3, the selection information forming section searches, based on the screen data group information, a storage section for storing the screen data groups, and when a screen data group registered in advance as the screen data group information is recognized, adds the screen data group as a selectable screen data group to the selection information. With the arrangement, when the selection information forming section searches the storage section and recognizes a screen data group registered in advance, the screen data group is added to the selection information. As a result, when a screen data group stored in a storage section cannot be used because, for example, the storage section cannot communicate with the programmable display device 3, the screen data group is not added to the selection information. Therefore, only operable screen data groups are added to the selection information, and accordingly it is easy to grasp operable screen data groups.

Alternatively, it is preferable that in the programmable display device 3, the selection information forming section searches a location information storage section for storing together storage location information items for showing locations of storage sections to which the screen data groups are stored as the screen data group information, and when a storage location information item is recognized, the selection information forming section adds a screen data group corresponding to the storage location information item, as a selectable screen data group, to the selection information.

With the arrangement, the selection information forming section forms the selection information, based on the storage location information as the screen data group information. As the storage location group information, information such as a network address for showing the location of a storage section is available. By using such storage location information, it is unnecessary to search the storage section as described above, and accordingly it is possible to shorten a period for searching the storage section connected with the network. Further, with the arrangement, when a screen data group stored in a storage section cannot be used because, for example, the storage section cannot communicate with the programmable display device 3, the screen data group can be added to selection information, based on the storage location information. Therefore, a screen data group stored in the storage section can be checked regardless of whether the screen data group can be used or not.

Further, another programmable display device 3 selects and displays one screen data item from one of screen data groups each constituted of a plurality of screen data items indicative of control conditions of a controlling device (PLC 4) which performs control action according to a sequence program, the programmable display device 3 including a screen data group setting section (project setting processing section 31b) for setting, based on specifying information for showing that a sequence program to be used is specified out of a plurality of sequence programs, a screen data group corresponding to the specified sequence program out of the screen data groups, as a screen data group to be used.

With the arrangement, when a sequence program such as a ladder program is changed into another sequence program due to a change of a production line and the like, the specifying information shows that the sequence program is specified. Then, the screen data group setting section sets a screen data group corresponding to the specified sequence program, as a screen data group to be used.

As a result, a plurality of screen data groups are switched and set, and thereby the screen data groups can be dispersed and managed in internal and external storage sections. Therefore, it is unnecessary to cause a screen data group to include screens corresponding to all kinds of products so as to respond to a variety of products from a single production line for the purpose of enabling limited production of a wide variety of products. As such, it is sufficient to provide screen data groups corresponding to each product. Further, the screen data groups are automatically switched according to a change of sequence programs, and therefore an operation for switching screen data groups is unnecessary.

It is preferable that either of the programmable display devices 3 includes a screen data group management section (project integration management section 31b) for integrating and managing the screen data groups as one screen data group. With the arrangement, it is possible to form a screen data group in such a manner that the screen data group is dispersed into a plurality of screen data groups. As a result, it is possible to develop a screen data group having a large size (having many screens) more effectively.

The display controlling program for operating the programmable display device 3 causes a computer to function as each of the sections. Further, the display controlling program is provided so as to be stored in a storage medium readable by a computer. As a result, a plurality of screen data groups are switched and set as described above, and therefore it is possible to disperse and manage the screen data groups.

As described above, the present programmable display device 3 switches and sets screen data groups to be used, by selecting a plurality of screen data groups based on selection information. This allows management of a plurality of screen data groups in a dispersed manner. Therefore, even when the programmable display device has a limited memory capacity, it is possible to switch and use a plurality of screen data groups. As a result, a desired screen data group can be promptly provided according to switching of production lines corresponding to a wide variety of products, and accordingly productivity increases.

In this way, the present programmable display device 3 is able to respond to a prompt change of production lines by switching and setting a plurality of project files, but also allows management of project files in a dispersed manner. Therefore, the present programmable display device 3 can be preferably used for a controlling system and the like which responds to limited production of a wide variety of products.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A programmable display device, which communicates with a programmable logic controller so as to acquire a condition of a device other than the programmable display device and connected with the programmable logic controller and causes the condition to be displayed and which instructs the programmable logic controller to control the device in accordance with an operation performed on a touch panel, the programmable logic controller acquiring output data of the device and providing control data to the device according to a ladder program created by a user, the programmable display device comprising:
   a selection display section for selecting and displaying one screen data item from one of screen data groups each constituted of a plurality of screen data items each being created by a user and being indicative of a screen with which the condition of the device is acquired and displayed and a control of the device is instructed;
   a selection information forming section for forming selection information used for selecting one of the screen data groups, based on previously registered screen data group information including names of the screen data groups and storage section information for specifying storage sections in which the screen data groups are stored, and for displaying the selection information as a list of the names and the storage section information corresponding to the names; and
   a screen data group setting section for reading out the one of the screen data groups which is selected based on the displayed names from the storage section specified by the storage section information and setting the one of the screen data groups as a screen data group to be used.

2. The programmable display device as set forth in claim 1, further comprising a screen data group management section for integrating and managing the screen data groups as one screen data group.

3. The programmable display device as set forth in claim 1, wherein the selection information forming section searches, based on the screen data group information, a storage section for storing the screen data groups, and when a screen data group registered in advance as the screen data group information is recognized, the selection information forming section adds the screen data group as a selectable screen data group to the selection information.

4. The programmable display device as set forth in claim 1, wherein the selection information forming section searches a location information storage section for storing together storage location information items for showing locations of storage sections to which the screen data groups are stored as the screen data group information, and when a storage location information item is recognized, the selection information forming section adds a screen data group corresponding to the storage location information item, as a selectable screen data group, to the selection information.

5. A programmable display device, which communicates with a programmable logic controller so as to acquire a condition of a device other than the programmable display device and connected with the programmable logic controller and causes the condition to be displayed and which instructs the programmable logic controller to control the device in accordance with an operation performed on a touch panel, the programmable logic controller being for acquiring output data from the device and providing control data to the device according to a ladder program created by a user, comprising:

a selection display section for selecting and displaying one screen data item from one of screen data groups each constituted of a plurality of screen data items being created by a user and being indicative of control conditions of the programmable logic controller; and a screen data group setting section for selecting, based on specifying information which shows that a ladder program to be used is specified out of a plurality of ladder programs, a screen data group corresponding to the specified ladder program out of the screen data groups, and for setting the screen data group as a screen data group to be used, wherein the specifying information is a bit switching command, included in a head part of the ladder program, for switching a switch bit so as to indicate that the ladder program is specified, the switch bit being provided so as to correspond to a name of a screen data group in a predetermined storage region, and the screen data group setting section sets, as a screen data group to be used, a screen data group having a name corresponding to the switch bit, when the ladder program is executed and thereby the bit switching command switches the switch bit corresponding to the ladder program.

6. The programmable display device as set forth in claim 5, further comprising a screen data group management section for integrating and managing the screen data groups as one screen data group.

7. A display controlling program embodied on a non-transitory computer readable storage medium for operating a programmable display device which communicates with a programmable logic controller so as to acquire a condition of a device other than the programmable display device and connected with the programmable logic controller and causes the condition to be displayed and which instructs the programmable logic controller to control the device in accordance with an operation performed on a touch panel, the programmable logic controller acquiring output data of the device and providing control data to the device according to a ladder program created by a user, said display controlling program causing a computer to carry out a selection display process for selecting and displaying one screen data item from one of screen data groups each constituted of a plurality of screen data items each being created by a user and being indicative of a screen with which the condition of the device is acquired and displayed and a control of the device is instructed, a selection information forming process for forming selection information used for selecting one of the screen data groups, based on previously registered screen data group information including names of the screen data groups and storage section information for specifying storage sections in which the screen data groups are stored, and for displaying the selection information as a list of the names and the storage section information corresponding to the names, and a screen data group setting process for reading out the one of the screen data groups which is selected based on the displayed names from the storage section specified by the storage section information and setting the one of the screen data groups as a screen data group to be used.

8. The display controlling program as set forth in claim 7, further causing a computer to carry out a screen data group management process for integrating and managing the screen data groups as one screen data group.

9. The display controlling program as set forth in claim 7, wherein the selection information forming process searches, based on the screen data group information, a storage section for storing the screen data groups, and when a screen data group registered in advance as the screen data group information is recognized, the selection information forming process adds the screen data group, as a selectable screen data group, to the selection information.

10. The display controlling program as set forth in claim 7, wherein the selection information forming process searches a location information storage section for storing together storage location information items for showing locations of storage sections to which the screen data groups are stored as the screen data group information, and when a storage location information item is recognized, the selection information forming process adds a screen data group corresponding to the storage location information item, as a selectable screen data group, to the selection information.

11. A display controlling program embodied on a non-transitory computer readable storage medium for operating a programmable display device which communicates with a programmable logic controller so as to acquire a condition of a device other than the programmable display device and connected with the programmable logic controller and causes the condition to be displayed and which instructs the programmable logic controller to control the device in accordance with an operation performed on a touch panel, the programmable logic controller being for acquiring output data of the device and providing control data to the device according to a ladder program created by a user, said display controlling program causing a computer to carry out a selection display process for selecting and displaying one screen data item from one of screen data groups each constituted of a plurality of screen data items being created by a user and being indicative of control conditions of the programmable logic controller, and a screen data group setting process for selecting, based on specifying information which shows that a ladder program to be used is specified out of a plurality of ladder programs, a screen data group corresponding to the specified ladder program out of the screen data groups, and for setting the screen data group as a screen data group to be used, wherein the specifying information is a bit switching command, included in a head part of the ladder program, for switching a switch bit so as to indicate that the ladder program is specified, the switch bit being provided so as to correspond to a name of a screen data group in a predetermined storage region, and the screen data group setting process sets, as a screen data group to be used, a screen data group having a name corresponding to the switch bit, when the ladder program is executed and thereby the bit switching command switches the switch bit corresponding to the ladder program.

12. The display controlling program as set forth in claim 11, further causing a computer to carry out a screen data group management process for integrating and managing the screen data groups as one screen data group.

13. A non-transitory storage medium readable by a computer, for storing a display controlling program for operating a programmable display device which communicates with a programmable logic controller so as to acquire a condition of a device other than the programmable display device and connected with the programmable logic controller and causes the condition to be displayed and which instructs the programmable logic controller to control the device in accordance with an operation performed on a touch panel, the display controlling program operating the programmable display device so as to display a screen with which the condition of the device is acquired and displayed and a control of the device is instructed, the programmable logic controller acquiring output data of the device and providing control data to the device according to a ladder program created by a user, wherein said display controlling program causes a computer to carry out a selection display process for selecting and displaying one screen data item from one of screen data groups each being created by a user and being constituted of a plurality of screen data items each indicative of the screen, a selection information forming process for forming selection information used for selecting one of the screen data groups, based on previously registered screen group information including names of the screen data groups and storage section information for specifying storage sections in which the screen data groups are stored, and for displaying the selection information as a list of the names and the storage section information corresponding to the names, and a screen data group setting process reading out the one of the screen data groups which is selected based on the displayed names from the storage section specified by the storage section information and setting the one of the screen data groups as a screen data group to be used.

14. The storage medium as set forth in claim 13, wherein the display controlling program further causes a computer to carry out a screen data group management process for integrating and managing the screen data groups as one screen data group.

15. The storage medium as set forth in claim 13, wherein the selection information forming process searches, based on the screen data group information, a storage section for storing the screen data groups, and when a screen data group registered in advance as the screen data group information is recognized, the selection information forming process adds the screen data group, as a selectable screen data group, to the selection information.

16. The storage medium as set forth in claim 13, wherein the selection information forming process searches a location information storage section for storing together storage location information items for showing locations of storage sections to which the screen data groups are stored as the screen data group information, and when a storage location information item is recognized, the selection information forming process adds a screen data group corresponding to the storage location information item, as a selectable screen data group, to the selection information.

17. A non-transitory storage medium readable by a computer, for storing a display controlling program for operating a programmable display device which communicates with a programmable logic controller so as to acquire a condition of a device other than the programmable display device and connected with the programmable logic controller and causes the condition to be displayed and which instructs the programmable logic controller to control the device in accordance with an operation performed on a touch panel, the display controlling program operating the programmable display device so as to display a screen with which the condition of the device is acquired and displayed and a control of the device is instructed, the programmable logic controller being for acquiring output data of the device and providing control data to the device according to a ladder program created by a user, said storage medium storing a display controlling program which causes a computer to carry out a selection display process for selecting and displaying one screen data item from one of screen data groups each constituted of a plurality of screen data items being created by a user and being indicative of control conditions of the programmable logic controller, and a screen data group setting process for selecting, based on specifying information for showing that a ladder program to be used is specified out of a plurality of ladder programs, a screen data group corresponding to the specified ladder program out of the screen data groups, and for setting the screen data group as a screen data group to be used, wherein the specifying information is a bit switching command, included in a head part of the ladder program, for switching a switch bit so as to indicate that the ladder program is specified, the switch bit being provided so as to correspond to a name of a screen data group in a predetermined storage region, and the screen data group setting process sets, as a screen data group to be used, a screen data group having a name corresponding to the switch bit, when the ladder program is executed and thereby the bit switching command switches the switch bit corresponding to the ladder program.

18. The storage medium as set forth in claim 17, wherein the display controlling program further causes a computer to carry out a screen data group management process for integrating and managing the screen data groups as one screen data group.

* * * * *